United States Patent [19]

Maillot

[11] Patent Number: 5,146,523
[45] Date of Patent: Sep. 8, 1992

[54] ALVEOLAR CONNECTOR COMPRISING AT LEAST ONE CONNECTION DEVICE FOR FIBER OPTICS

[75] Inventor: Gérard Maillot, Neuilly Plaisance, France

[73] Assignee: Radiall, Rosny-Sous-Bois, France

[21] Appl. No.: 767,275

[22] Filed: Sep. 27, 1991

[30] Foreign Application Priority Data

Sep. 28, 1990 [FR] France .................. 90 12012

[51] Int. Cl.⁵ ............................................ G02B 6/26
[52] U.S. Cl. .................................. 385/60; 385/72; 385/62; 385/78; 385/81
[58] Field of Search ................ 385/25, 58, 62, 60, 385/67, 72, 78, 81, 84

[56] References Cited

U.S. PATENT DOCUMENTS

| | | | |
|---|---|---|---|
| 4,178,068 | 12/1979 | Hoover | 385/138 |
| 4,406,514 | 9/1983 | Hillegonds et al. | 385/60 X |
| 4,681,398 | 7/1987 | Bailey et al. | 385/84 |
| 4,726,647 | 2/1988 | Kakii et al. | 385/60 |
| 4,747,659 | 5/1988 | Takahashi | 385/67 |
| 4,805,978 | 2/1989 | Bruch et al. | 385/60 |
| 4,812,006 | 3/1989 | Osborn et al. | 385/78 |
| 4,846,544 | 7/1989 | Bortolin et al. | 385/84 |
| 4,892,378 | 1/1990 | Zajac et al. | 385/78 |
| 4,925,266 | 5/1990 | Huebscher et al. | 385/78 |
| 4,964,690 | 10/1990 | Lappöhn et al. | 385/58 |

FOREIGN PATENT DOCUMENTS

| | | | |
|---|---|---|---|
| 0246166 | 11/1987 | European Pat. Off. | 385/60 X |
| 9005904 | 9/1990 | Fed. Rep. of Germany | 385/60 X |
| 2210994 | 6/1989 | United Kingdom | 385/84 |

Primary Examiner—Brian Healy
Attorney, Agent, or Firm—Schweitzer Cornman & Gross

[57] ABSTRACT

The invention relates to an alveolar connector, comprising male and female connector elements (2,23) having parts provided with aligned sockets suitable for receiving at least one connection device for fiber optics formed of a male contact (1) and a female contact (22) working together, the one fixed in its socket, and the other axially movable in its socket, between a disconnection position and a connection position. A ring (8) surrounding the movable contact (1) is installed and immobilized axially in the socket, the movable contact and the ring comprising conical and/or cylindrical contact areas (15,16,17,12,13) on their opposite surfaces, arranged and disposed in such a manner than in the disconnection position and during a part of the course of displacement of the movable contact during the course of the connection and disconnection phases, at least one contact area (12,13) of the ring essentially rests against a contact area (16,17) of the movable optic contact, and that in the connection position, the contact areas of the ring and the movable contact are radially separated from each other.

9 Claims, 4 Drawing Sheets

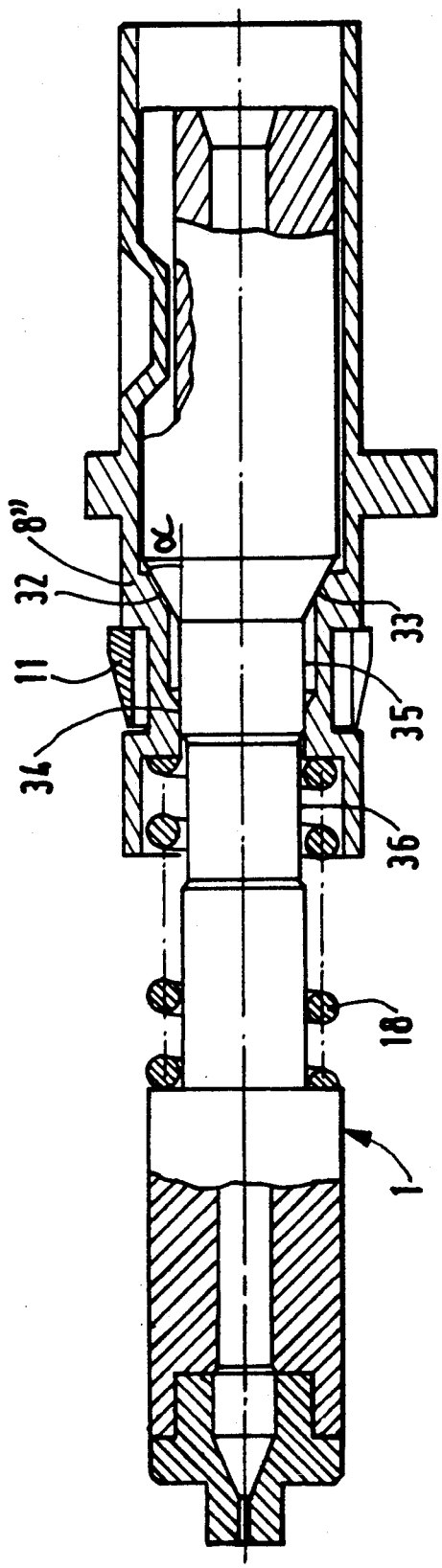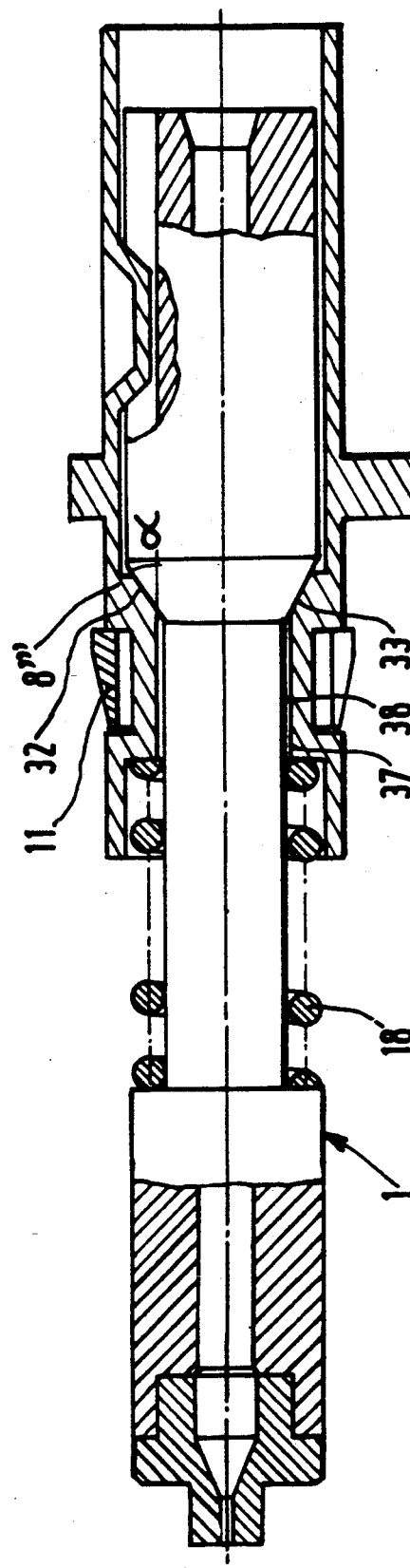

ALVEOLAR CONNECTOR COMPRISING AT LEAST ONE CONNECTION DEVICE FOR FIBER OPTICS

BACKGROUND OF THE INVENTION

The present invention relates to an alveolar connector, comprising a male connector element and a female connector element, having parts provided with aligned sockets suitable for receiving at least one connection device for fiber optics formed of a male contact and a female contact working together.

Such connectors, generally of the multicontact type, are used to connect cables or tracks of a printed circuit board, a so-called daughter board, to the tracks of another printed circuit board, the so-called mother board.

In this application, an element of the alveolar multicontact connector of the male type is installed on the daughter board, and a corresponding female element is installed on the mother board.

Such connectors for printed circuit boards comprise sockets meant to hold different types of contacts, particularly sockets meant to receive coaxial contacts.

An example of such connectors is provided by the series of connectors corresponding to the standard DIN 41612.

Taking into account the development of connections for fiber optics, it has, of course, been envisaged to install devices for connecting fiber optics in this type of connector, by putting a male optic contact of a fiber optic connection device in place in a socket of one of the connector elements, and the female optic contact in a socket of the opposite connector element.

Now, optic contacts, particularly contacts for monomode fiber optics, must have very good axial and angular guidance if there is to be only slight weakening of the connection.

This guidance is generally obtained by the presence of radial play between the opposite surfaces of the male optic contact and the female optic contact when the connection is made.

This guidance is satisfactory if one is directly assembling a male contact and a female contact installed, respectively, at the end of optic cables.

However, this guidance is no longer satisfactory if the male and female optic contacts have first each been installed in a socket of an alveolar multicontact connector element for printed circuit boards, of the type mentioned above.

In fact, the sockets of these connector elements, as well as their position in the insulating parts of the connector elements, have tolerances incompatible with the guidance demanded for optic contacts. These tolerances, in fact, were defined for coaxial connectors, which require a much lower precision of guidance than fiber optics. The tolerances for coaxial contacts, as defined, in particular, in the standard DIN 41612, are such that the sockets of the male and female connector elements (outlet and plug of the connectors for printed circuit boards) are not sufficiently well aligned, due to eccentric movements, for well guided coupling of optic contacts placed in the sockets of these connector elements.

SUMMARY OF THE PRESENT INVENTION

The present invention proposes to achieve an alveolar connector which makes it possible to receive at least one connection device for fiber optics in the aligned sockets of the connector elements, with good axial and angular guidance, in spite of eccentric movements of the sockets.

The connector according to the invention comprises at least one connection device for fiber optics comprising a male optic contact and a female optic contact, each of which can be engaged in a socket of one of the connector elements, with one of the said contacts being installed fixed in its socket, while the other can move axially in its socket, between a disconnection position and a connection position of the connection device for fiber optics, and being characterized by the fact that it comprises a ring surrounding the said movable contact, installed and immobilized axially in the socket, the said movable contact and the said ring comprising conical and/or cylindrical parts on their opposite surfaces, arranged and disposed in such a manner than in the said disconnection position, and preferably also during a part of the course of displacement of the movable contact during the course of the connection and disconnection phases, at least one contact area of the said ring essentially rests against a contact area of the movable optic contact, and that in the said connection position, the said contact areas of the said ring and the said movable contact are separated from each other.

The contact areas of the ring and the movable optic contact mentioned above thus comprise means of pre-guidance which allow the movable optic contact to be centered relative to its socket in the disconnection position.

In this position, there is a very slight radial play between the ring and the contact, as well as between the ring and the socket.

In the connection position of the movable contact, there is sufficient radial play between the opposite contact areas of the ring and the movable contact to permit eccentric movements of the sockets.

Preferably, the movable optic contact is the male contact of the connection device for fiber optics, and elastic means are provided to push the male optic contact back towards its connection position. In particular, these elastic means can be comprised of a compression spring installed between the frontal end of the ring and a disengaged contact area of the male optic contact, with the displacement of the male optic contact relative to the ring during connection being brought about against the force of this spring, and the said spring pushing the male contact back in the direction of the female contact in the connection position.

In a particular embodiment of the invention, the movable contact comprises at least two cylindrical contact areas of different diameters on its outside surface, with the ring comprising a contact area which is located essentially resting against a contact area of the movable contact in the disconnection position, and opposite and separated with play from another contact area of the said contact, with a smaller diameter, in the disconnection [sic] position. Preferably, the contact comprises two contact areas with different diameters, against which two contact areas of the ring, with different diameters, rest in the disconnection position.

In another embodiment, the ring and the contact comprise conical contact areas which rest against each other in the disconnection position.

In a particular embodiment, particularly when the optic faces of the contacts are implemented in oblique manner, or if good reproducibility of the connection losses are to be achieved for a large number of couplings, angular positioning means are provided for the movable optical contact relative to the board on which the alveolar connector element housing the said movable optic contact is installed.

In a preferred embodiment, these angular positioning elements are comprised of a finger projecting radially from the ring and engaging with a radial notch of a cylindrical hole made in the corresponding board for passage of the contact, the said ring furthermore comprising a pin housed in a longitudinal groove of the movable contact.

In this way, the contact is prevented from turning freely in its receiver socket, when the connector element is installed on the board.

The connection devices for fiber optics which can be used within the scope of the invention can be any appropriate type, particularly the type described by the applicant company in EP-A-0063085.

In this case, the male optic contact installed at the end of a fiber optic cable comprises a ferrule having a tubular axial protuberance, and, behind the protuberance and surround the back part of it, an annular recess, the wall of which has a conical profile, for example.

The female optic contact comprises a female reconstitution coupling which has, in its central part, inside a longitudinal bore, an abutment part, particularly a sphere, with an axial traverse orifice, and, around the latter, contact areas for the ferrule of the male contact, on the one hand, and for the ferrule of the male contact installed at the end of the other fiber optic cable, to be connected and previously engaged in the female reconstitution coupling, on the other hand. The female optic contact thus comprises the female reconstitution coupling, on the one hand, and the second male ferrule, on the other hand.

The opposite contact areas of the abutment and of the male ferrules are arranged in such a manner that in case of any relative movement of the contact areas which are in contact, the end of a fiber at the level of the face of the end of the protuberance of a male ferrule would be kept at a predetermined constant distance from the center of the abutment part.

The faces of the ends of the protuberances of the ferrules and of the fibers immobilized in their interior are straight, i.e. perpendicular to the longitudinal axis of the connection device, but can be angled relative to this axis if an attenuation function is desired, as described, for example, in the French patent application FR-A-2 598 820 of the applicant company.

For the purpose of making the invention better understood, an embodiment will be described below, as a non-limiting example, referring to the attached drawings, in which:

DETAILED DESCRIPTION OF THE INVENTION

Figure 1:
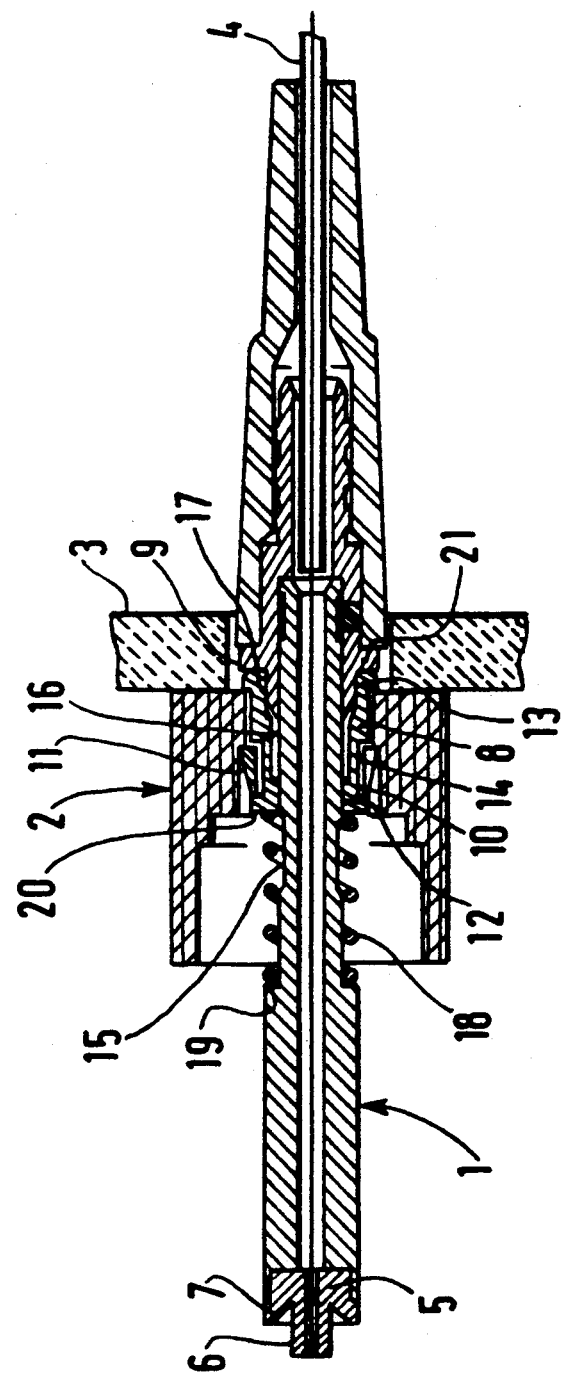
FIG. 1 is a view, in cross-section, of a connector element, in a socket in which a male optic contact is installed.

First of all, reference is made to FIG. 1.

This figure represents, in cross-section, a male optic contact designated as a whole as 1, installed in a socket of the insulating part of a female alveolar connector designated as 2, and installed on a printed circuit mother board 3.

The contact 1 is installed at the end of a fiber optic cable 4, for example of the monomode type, and comprises a ferrule 5 with an axial protuberance 6 at its front end, at the end of which there is the end of the optic fiber, and recessed in the said protuberance is a conical contact area 7.

According to the invention, a ring 8 is provided, held axially in the socket of the plug 2, and installed with slight radial play in it.

For this purpose, the ring 8 comprises a flange at its back end, engaging behind the face of the back end of the plug 2, and a neck 10, in which a split washer 11 comprising an exterior conical contact area is housed, jutting out towards the back, resting against one of the annular contact areas of the ring 8 which define the neck 10 and an annular contact area of the plug 2.

In the example illustrated, the ring comprises two cylindrical contact areas 12, 13, separated axially and with different diameters, separated by a cylindrical contact area with an intermediate diameter 14.

The outside surface of the male contact 1 also has several successive cylindrical contact areas with different diameters, specifically a contact area with reduced diameter 15, a contact areas with intermediate diameter 16, and a contact area with the largest diameter 17.

As can be seen in FIG. 1 in the disconnection position, the male contact 1 is equipped with the ring 8, the arrangement being such that the contact areas of the outside surface of the contact essentially come to rest against the contact areas of the inside surface of the ring, with the term "essentially come to rest" meaning that there is very slight radial play between these contact areas.

As can be seen in FIG. 1 in the disconnection position, the contact area 12 of the ring essentially rests against the contact area 16 of the contact, and, in the same manner, the contact area 13 of the ring essentially rests against the contact area 17 of the contact.

The male contact 1 can be moved axially relative to the ring 8, which is fixed in the socket, a retraction spring 18 installed around the contact and resting against a contact area 19 of the contact and the face of the front end 20 of the ring 8 being provided to bring the contact into the disconnection position of FIG. 1, from the connection position illustrated in FIG. 2, which will be described below.

The axial longitudinal displacement of the contact relative to the ring is limited by an abutment flange 21 produced in the contact and coming to rest against the flange 9 at the back of the ring.

Figure 2:
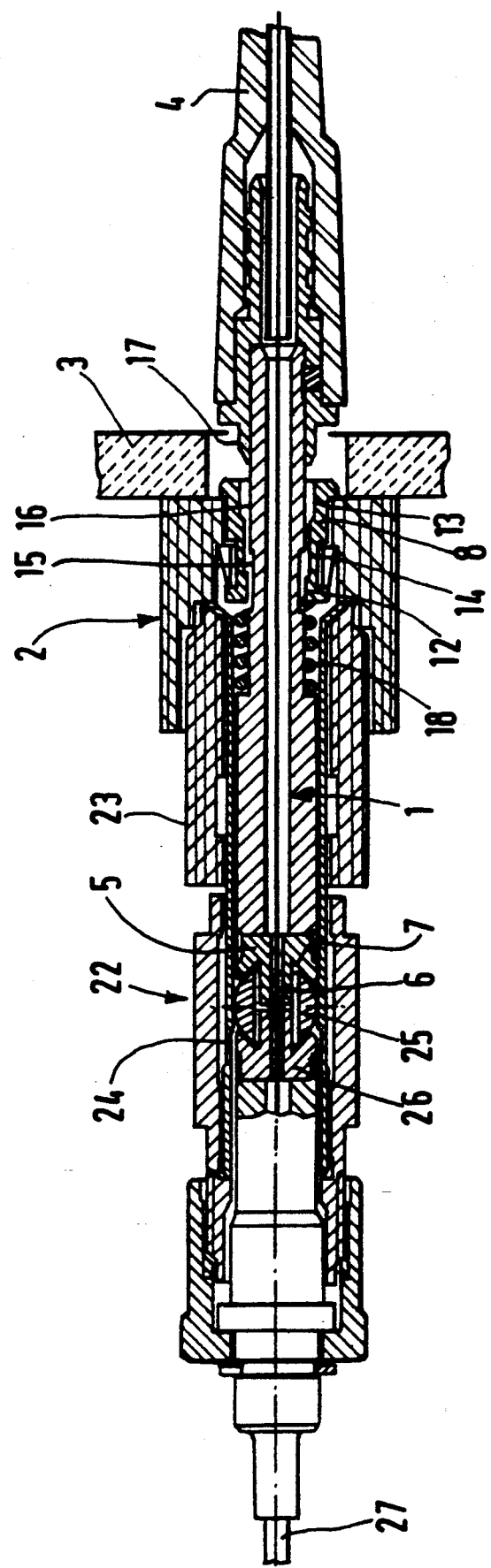
FIG. 2 is a view, in cross-section, showing a connector according to the invention, for printed circuit boards, in a connection position, one of the cards not being shown.

FIG. 2 illustrates the connector according to the invention in the connection position, with a female optical contact designated as a whole as 22 and housed in a male connector element 23 being connected to the element of the male contact 1.

In FIG. 2, the "daughter" printed circuit board is not illustrated.

The female optic contact 22 comprises a female reconstitution coupling 24 with a spherical recessed abutment part 25 and a male ferrule 26 analogous to the male ferrule 5 and installed at the end of a ferrule fixed to the fiber optic cable 27 to be connected to the cable 4.

As can be seen in FIG. 2, in this connection position and due to the fact of the axial displacement which has occurred in the male optic contact 1 relative to the ring 8, there is major radial play between the contact areas of the contact and those of the ring, which are essentially resting against each other in the disconnection position illustrated in FIG. 1.

The contact area 12 of the ring is thus opposite and at a distance from the contact area with the smallest diameter 15 of the contact, and the contact area 13 of the ring is opposite and at a distance from the contact area 16 of the contact.

This radial play makes it possible to accept eccentric movements of the connector elements 2 and 23.

Thus, according to the invention, the sockets previously provided for other types of contacts, for example coaxial contacts, can be used for the purpose of making fiber optic connections.

In one embodiment, not shown, the contact area 17 of the contact can have the same diameter as the contact area 16 of the contact, and the contact areas 13 and 14 of the ring can have the same diameter as the contact area 12 of the ring.

Figure 3:
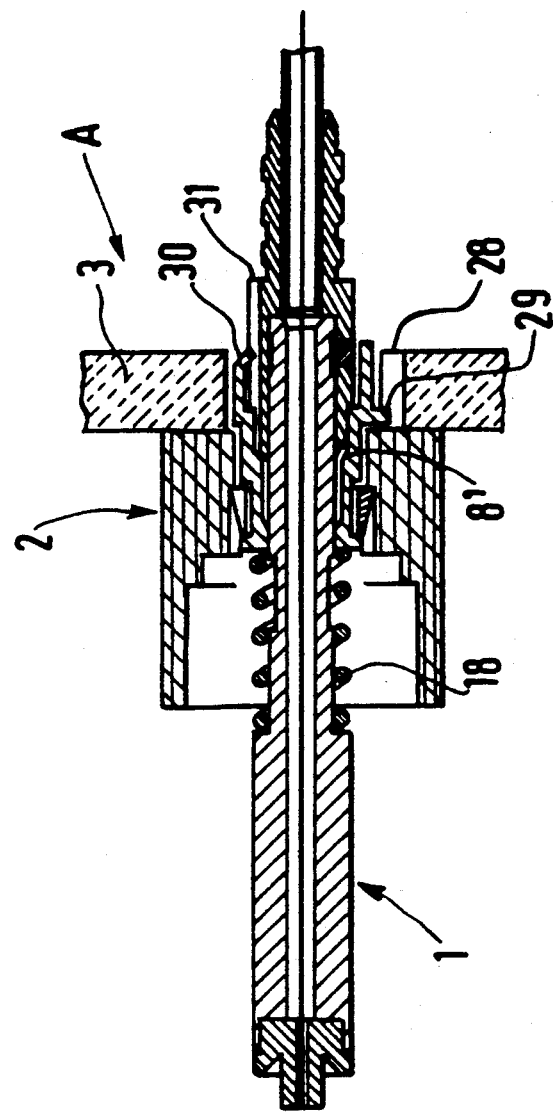
FIG. 3 is a view, in cross-section, of a variant of the embodiment of the connector element of FIG. 1.
Figure 4:
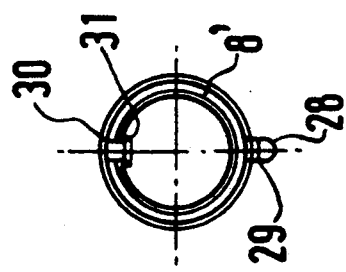
FIG. 4 is an end view in the direction of the arrow A in FIG. 3, FIGS. 5 and 6 are views, in partial cross-section, of variants of the male optic contact according to the invention.

The variant in FIG. 3 differs from that in FIG. 2 by the fact that angular positioning means are provided for the movable male optic contact 1 on the board 3.

For this purpose, the cylindrical hole punched in the board for passage of the contact comprises a notch 28 which receives the radial finger 29 of the ring 8', with play.

The ring 8' furthermore comprises a pin 30 housed in a groove 31 of the contact.

Thanks to these characteristics, the contact cannot turn freely in the socket in which it is installed.

In the variant illustrated in FIG. 5, the ring 8" comprises a conical contact area 32 on its inside surface, resting against a conical contact area 33 of the outside surface of the contact 1 in the disconnection position. The angle $\alpha$ of the conical contact areas 32 and 33 with the axis of the contact is preferably between 10° and 20°, and advantageously 15°.

The ring 8" comprises a cylindrical contact area 34, which, like the cylindrical contact area 12 of the embodiment in FIGS. 1 and 2, essentially rests against a cylindrical contact area 35 of the contact which comprises an adjacent contact area with a lesser diameter, in the disconnection position. Functionally, the contact areas 35 and 36 correspond to the contact areas 15 and 16, respectively, of the embodiment in FIGS. 1 and 2.

The embodiment in FIG. 6 differs from that in FIG. 5 by the fact that the ring 8'" comprises a cylindrical contact surface 37 separated with radial play from the cylindrical contact surface 38 of the contact, in the disconnection position. In this embodiment, only the conical contact areas 32 and 33 assure the function of pre-guidance according to the invention.

Although the invention has been described in connection with particular embodiments, it is certainly not limited to these, and numerous variants and modifications can be applied, without thereby leaving the scope or the spirit of the invention.

I claim:

1. Alveolar connector, comprising a male connector element and a female connector element, having parts provided with aligned sockets suitable for receiving at least one connection device for fiber optics formed of a male contact and a female contact working together, each of which can be engaged in a socket of one of the connector elements, with one of the said contacts being installed fixed in its socket, while the other can move axially in its socket, between a disconnection position and a connection position of the connection device for fiber optics, characterized by the fact that it comprises a ring (8; 8'; 8"; 8'") surrounding the said movable contact (1), installed and immobilized axially in the socket, the said movable contact and the said ring comprising conical and/or cylindrical contact areas on their opposite surfaces, arranged and disposed in such a manner than in the said disconnection position, and preferably also during a part of the course of displacement of the movable contact during the course of the connection and disconnection phases, at least one contact area (12, 13; 32, 34; 32) of the said ring essentially rests against a contact area (16, 17; 33, 35; 33) of the movable optic contact, and that in the said connection position, the said contact areas of the said ring and the said movable contact are separated from each other.

2. Connector pursuant to claim 1, characterized by the fact that the said movable optic contact is the male contact (1) of the connection device for fiber optics, and that elastic means (18) are provided to push the male optic contact back towards its connection position.

3. Connector pursuant to claim 2, characterized by the fact that the said elastic means comprise a compression spring (18) installed between the frontal end (20) of the said ring (8; 8'; 8"; 8'") and a disengaged contact area (19) of the male optic contact, with the displacement of the male optic contact relative to the ring during connection being brought about against the force of this spring, and the said spring, which pushes the male contact back in the direction of the female contact in the connection position.

4. Connector claim 1, characterized by the fact that the said ring comprises a cylindrical contact area (12; 34) on its inside surface, which essentially rests against a cylindrical contact area (16; 35) of the outside surface of the movable contact, in the disconnection position, and opposite and separated with play from another cylindrical contact area (15; 36), with a smaller diameter, of the said contact, in the connection position.

5. Connector claim 3, characterized by the fact that the said contact comprises two cylindrical contact areas (16, 17) of different diameters on its outside surface, against which two contact areas (12, 13) of different diameters of the ring essentially rest in the disconnection position.

6. Connector claim 1, characterized by the fact that said the ring comprises a conical contact area (32) on its inside surface, which rests against and a conical contact area (33) of the outside surface of the contact in the disconnection position.

7. Connector pursuant to claim 6, characterized by the fact that the said conical contact areas form an angle between 10° and 20°, preferably 15°, with the axis of the contact.

8. Connector claim 1, characterized by the fact that it comprises angular positioning means of the movable optical contact relative to the board (3) on which the alveolar connector element (2) housing the said movable optic contact is installed.

9. Connector pursuant to claim 8, characterized by the fact that the said angular positioning elements comprise a finger (29) projecting radially from the ring (8') and engaging with a radial notch (28) of a cylindrical hole made in the board for passage of the contact, the said ring (8') furthermore comprising a pin (30) housed in a longitudinal groove (31) of the movable contact.

* * * * *